United States Patent [19]

Bade et al.

[11] 4,192,687

[45] Mar. 11, 1980

[54] LINING MATERIALS

[75] Inventors: Werner Bade, Bendorf; Günther Gelsdorf, Nordenstadt; Gunther Wieland, Wiesbaden, all of Fed. Rep. of Germany

[73] Assignees: Didier-Werke AG; Mannesmann AG, both of Wiesbaden, Fed. Rep. of Germany

[21] Appl. No.: 929,815

[22] Filed: Jul. 31, 1978

[51] Int. Cl.² .............................................. B28B 7/36
[52] U.S. Cl. .............................. 106/38.24; 106/38.22; 106/38.28; 106/38.3; 264/338; 427/135; 164/33
[58] Field of Search ............... 106/38.22, 38.24, 38.28, 106/253, 260, 261; 264/338; 427/135; 164/33

[56] References Cited

U.S. PATENT DOCUMENTS

| 996,590 | 6/1911 | Krueger et al. | 106/38.24 |
| 2,539,631 | 1/1951 | Kuzmick | 106/253 |
| 3,962,492 | 6/1976 | Phelps | 106/38.27 |
| 4,046,187 | 9/1977 | Matsuyama et al. | 106/38.23 |

Primary Examiner—Hosea E. Taylor
Assistant Examiner—W. Thompson
Attorney, Agent, or Firm—Wenderoth, Lind & Ponack

[57] ABSTRACT

Materials suitable for lining vessels designed to hold molten iron or steel are provided herein. These materials are made of burned dolomite, containing 1–6% of a natural glyceride oil or a mixture of such oils and 2–6% by weight of a dry inorganic particulate bonding agent, such as potassium silicate or phosphate.

10 Claims, No Drawings

LINING MATERIALS

The invention relates to lining materials based on burned granular dolomite and containing organic and inorganic additives for lining vessels designed to hold molten iron or steel.

Many materials are already known for lining vessels designed to hold molten iron or steel, particularly ladles, which can be applied to the vessel walls by projecting them horizontally from a centrifugal ramming machine without the use of a form or vertically behind a form by means of a so-called slinger. Such materials may be either basic or acidic, for instance as disclosed in the published specifications of German patent applications Nos. 2404026 and 1229438. These two publications describe the incorporation in such materials of organic additives in the form of mineral oils or mineral oils plus fatty acids, for the purpose of improving the properties of the materials.

DESCRIPTION OF THE PRIOR ART

The material described in the specification of German patent application No. 1229438 may consist of dolomite with an addition of 0.1 to 0.2% by weight of a neutral mineral oil to allay the evolution of dust. Materials based on burned dolomite have the disadvantage of a short storage life because burned dolomite has a very strong tendency to hydrate. In this connection the published specification of German patent application No. 1471192, in column 2, at lines 10 to 32, states that hydration, i.e. due to the natural humidity of atmospheric air, cannot be effectively prevented by the introduction of hydrophobic agents, such as hydrocarbon oils. Materials based on burned dolomite containing the presently known organic additives cannot therefore be kept in store for any length of time.

Apart from the possible lengthening of their storage life by the introduction of mineral oils and fatty acids, basic materials based on dolomite, like those based on magnesia, are provided in all the above named publications with additions of pitch or tar. These are a nuisance because of the fumes and odour which evolve on burning when such materials are employed. No additions of inorganic binders are proposed.

SUMMARY OF THE INVENTION

It is an object of the present invention to provide materials based on burned dolomite which can be stored for extended periods of say 3 and more months without hydration, in other words which will tend not to change their properties by taking up moisture from the atmospheric air.

It has been found that such materials based on burned dolomite of a grain size appropriate for their intended use and containing organic and inorganic additives can be obtained by introducing a natural triglyceride oil or a mixture of such triglyceride oils as an organic additive and a dry inorganic binder as an inorganic additive into the mixture.

The materials proposed by the invention may be characterised by a content of 1 to 6% by weight of a natural triglyceride oil or of a mixture of triglyceride oils and by a content of 2 to 6% by weight of a dry ground inorganic binder.

DESCRIPTION OF THE PREFERRED EMBODIMENTS

Thus according to the present invention, a material suitable for use as a lining for vessels designed to hold molten iron or steel comprises burned granular dolomite, 1 to 6% by weight of a natural triglyceride oil or of a mixture of triglyceride oils and 2 to 6% by weight of dry inorganic particulate, e.g. ground, binding agents, e.g. a sodium or potassium silicate or a sodium or potassium phosphate or mixtures thereof, and optionally paper flour or finely shredded paper or carbon-containing substances or a mixture thereof.

In a preferred embodiment the content of triglyceride oil may be between 2 and 4% by weight. With advantage the triglyceride oil may be of vegetable origin, particularly soy-bean oil.

It has further been found that an addition of 0.5 to 3% by weight of a dried paper flour (finely shredded paper) further improves the suitability of the proposed material for application by a slinger machine because it promotes rapid drying after application. Preferably the addition of paper flour will be between 1 and 2% by weight. Other additions of carbon-containing substances, e.g. in the amounts of 1% to 3% by weight; for example carbon black, graphite, or ground coke are also possible. It should be mentioned that the above quantities in percent by weight relate to the total dry mass.

The proposed materials may be applied in the conventional manner. For instance when lining ladles for molten iron or steel the finished mass is projected with great force and at high speed from above by the impeller head of a slinger machine into the space between the ladle wall and a special form that is introduced for the purpose.

When the lining is complete the form is removed. The inner cohesion of the mass is so great that it not only retains its shape, but its green strength is high enough to withstand further handling, such as transportation of the ladle to the firing oven without the lining being damaged. The values measured with the conventional Fischer instrument for measuring indentation depth are over 90. The lining is then heated and sintered or fired by the first heat of molten iron or steel filled into the ladle.

The burned dolomite used for the proposed materials may be obtained from any natural dolomite source, submitted to conventional firing followed by crushing and/or grinding and possibly screening for the removal and recombination of specified grain size fractions or the removal of specified grain size fractions. The term dolomite is understood to include not only substances having the chemical formula $CaCO_3 \cdot MgCO_3$, but also materials in which the proportions of $CaCO_3$ and $MgCO_3$ are subject to major fluctuations, as well as materials in which some of the magnesium in the dolomite is replaced by iron or manganese. For instance, dolomites containing 54.5% $CaCO_3$ and 42.8% $MgCO_3$ as well as dolomites containing 3.9% $CaCO_3$ and 89.22% $MgCO_3$ are known naturally occuring minerals.

The grain size analysis of the burned dolomite which is used for the preparation of the proposed materials preferably comprises at least 35% under 0.09 mm, i.e. having the consistency of flour, whereas the remaining 65% should have a grain size distribution ranging from 0.09 mm to 4 mm or 6 mm. The upper limit of the grain size distribution may, if desired, be 2 or 3 mm. Preferably the proportion having a grain size under 0.09 mm may be as high as 50%.

The binders used for the proposed materials may be dry ground sodium or potassium silicate, a sodium or potassium metaphosphate or a mixture thereof. Preferably a quantity of binder between 2 and 6% by weight may be added. Primarily the binder should be an inorganic water-soluble substance. The proposed material may be prepared by any method conventionally used for mixing dry components. For instance, the burned dolomite and the dry ground binder may be mixed first and the appropriate quantity of natural triglyceride oil introduced afterwards. On the other hand, it would also be possible first to mix the burned dolomite with the triglyceride oil and then to mix this mixture with the dry ground binder to ensure that the triglyceride oil will preferentially coat the particles of burned dolomite and thus reduce the tendency of the burned dolomite to hydrate.

However, according to the invention it is preferred to introduce the triglyceride oil and to mix it before any possible addition of paper flour is made, to prevent the triglyceride oil from being preferentially absorbed by the highly porous paper flour.

The triglyceride oil is conveniently introduced by first heating the triglyceride oil, e.g. to a temperature of 60° C., to reduce its viscosity and by then spraying it through a nozzle on the solids particles whilst these are being agitated in a mixer, thereby ensuring as uniform a distribution as possible without excessively long mixing times.

The paper flour or finely shredded paper which may be added to the proposed composition is a disintegrated paper reduced to a maximum fibre length of 1 to 3 mm and dried.

It transpires that the addition of paper flour to the proposed materials reduces the time needed for heating after application of the mass to the walls of the vessel for instance by a slinger machine.

The addition of carbon black, graphite or ground coke imparts improved properties to the mass in resisting chemical attack by the melt.

The proposed materials are of crumbly consistency for use and suitable for application by a slinger machine.

The natural triglyceride oils used for the preparation of the proposed materials are so-called "fatty oils", i.e. liquid fats which consist principally of mixed glycerol esters of higher fatty acids having an even number of carbon atoms, and so-called "drying oils", i.e. liquid "fats" which contain a relatively high proportion of fatty acids having several unsaturated bonds.

Examples of such natural triglyceride oils are the following vegetable oils:- Soybean oil, blown soybean oil, steam treated soybean oil, linseed oil, corn germ oil, poppy seed oil, rapeseed oil, safflower oil, olive oil, cotton seed oil, peanut oil, and wood oil. Examples of animal triglyceride oils are the different fish oils, such as herring oil, (cod) liver oil, sardine oil, whale oil and sperm oil. These natural triglyceride oils may possibly be subjected to a preliminary treatment, such as "blowing with steam" as practised in the case of "blown soybean oil". The triglyceride oil may also undergo a conventional treatment, such as a treatment with fuller's earth or a deodorising treatment.

In the above examples linseed oil, soybean oil and safflower oil are counted among the "drying oils".

Soybean oil and particularly deacidified and bleached soybean oil has proved to be particularly useful for incorporation in materials according to the invention. It also creates no environmental nuisance, such as evolution of odours and fumes. The soybean oil has a flow point of minus 10–16° C. (method Ubbelohde) and a flash point of 282° C. (Din 7732, page 1).

Naturally, instead of only one triglyceride oil, a mixture of triglyceride oils may be added. The triglyceride oils should be liquid at a temperature of 10° C.

The invention will now be illustrated by the following examples:

EXAMPLE 1

1000 kg of a mixture of burned dolomite having a grain size analysis of 35% by weight under 0.09 mm and 65% by weight of 0.09 to 3 mm was filled into a heated mixer at 180° C. 4% by weight, related to the finished mass, of a commercial soybean oil was sprayed on the moving mixture with a nozzle. The mixing was continued until a crumbly mass was obtained. 2.0% by weight of a finely ground sodium phosphate together with 0.5% by weight of a finely ground sodium silicate (grain size under 0.09 mm) were then added as inorganic binding agents, mixing being continued for another 4 minutes. The overall mixing time amounted to 12 minutes. This mass was applied by a slinger to the inside wall of a raw steel ladle to provide it with a wear resistant lining. Mixing could also have been accomplished in a cold mixer at room temperature.

A second batch of the proposed ready mixed mass was stored under seal for three months. At the end of this period of storage the mass proved to be just as satisfactory in use as a freshly prepared mass.

EXAMPLE 2

The method of preparation described in Example 1 was repeated excepting that the normal soybean oil was replaced by a bleached deacidified oil.

What we claim is:

1. A material suitable for use as lining for vessels designed to hold molten iron or steel consisting essentially of burned granular dolomite, 1 to 6% by weight of a natural triglyceride oil or a mixture of triglyceride oils and 2 to 6% by weight of dry inorganic particulate binding agents.

2. A material as claimed in claim 1 containing paper flour or finely shredded paper or other carbon containing substances or a mixture thereof.

3. A material as claimed in claim 1 which contains 2 to 4% by weight of triglyceride oil.

4. A material as claimed in claim 1 in which the triglyceride oil is a vegetable triglyceride oil.

5. A material as claimed in claim 4 in which the triglyceride oil is soybean oil.

6. A material as claimed in claim 1 in which the binding agents comprise sodium or potassium silicate or sodium or potassium phosphate or mixtures thereof.

7. A material as claimed in claim 1 containing 0.5 to 3% by weight of a dried paper flour.

8. A material as claimed in claim 7 containing 1 to 2% by weight of dried paper flour.

9. A material as claimed in claim 2 containing 1 to 3% by weight of carbon containing substances.

10. A material as claimed in claim 9 in which the carbon containing substances comprise carbon black, graphite or ground coke.

* * * * *